Patented Sept. 12, 1950

2,521,950

UNITED STATES PATENT OFFICE 2,521,950

STABILIZED POLYVINYL ALKYL ETHERS

Calvin E. Schildknecht, Montclair, N. J., assignor to General Aniline & Film Corporation, New York, N. Y., a corporation of Delaware No Drawing. Application December 31, 1947, Serial No. 795,149

3 Claims. (Cl. 260—45.8)

This invention relates to the preparation of stabilized polyvinyl alkyl ethers of improved color and to the stabilized polymers.

The polyvinyl alkyl ethers are sensitive to heat and by this agency suffer depolymerization or breakdown in molecular weight, chiefly to lower polymers and the alcohols from which the vinyl alkyl ether monomers were derived. Secondarily, the alcohols may undergo air oxidation to aldehydes, ketones, or acids. Depending upon the temperature and length of the exposure, the polymers are depolymerized to varying degrees, for example, the higher molecular weight polymers are subject to loss in their rubber-like properties of pressure tack, flexibility, and form-stability. While the depolymerization is more rapid at elevated temperatures, it is not limited thereto, but takes place even at room temperature in contrast to the behavior of polystyrene and methyl methacrylate polymers which suffer depolymerization only at elevated temperatures, e. g., at 200–300° C.

This sensitivity of the polymers to heat is a serious hindrance to their successful application in the arts, particularly in respect to the use of the medium to high molecular weight rubber-like polymers as substitutes for rubber, for example, in the preparation of pressure-sensitive adhesives. It is, accordingly, desirable to protect them against thermal depolymerization and resulting loss in valuable properties.

An effective agent for the purpose of retarding depolymerization of polyvinyl alkyl ethers by heat is p-hydroxy-N-phenylmorpholine. It is used in varying small amounts. Positive results can be obtained with as little as 0.2% by weight thereof on the polymer. Larger amounts can also be used, but as a practical upper limit about 2% by weight on the polymer is advised.

The use of p-hydroxy-N-phenylmorpholine as a stabilizer for polymerized vinyl akyl ether suffers from the disadvantage, however, of discoloration of the polymer.

It is an object of the present invention to improve the color of polyvinyl alkyl ethers which are stabilized by the addition thereto of p-hydroxy-N-phenylmorpholine.

This object I have found can be accomplished when in addition to the stabilizer there is added to the polymer an amount of an alkali, which may be an alkali metal hydroxide, carbonate or bicarbonate, sufficient to place the polymer definitely on the alkaline side, that is, the polymer has an alkalinity equal at least to a pH value of 9 as measured by the glass electrode.

A further advantage of my invention is to be found in the tendency of the alkali to still further improve the resistance of polymeric vinyl alkyl ethers to depolymerization by heat.

The monomeric vinyl alkyl ethers, for example, vinyl methyl ether, vinyl ethyl ether, vinyl isopropyl ether, vinyl n-butyl ether, vinyy isobutyl ether and the like, can be polymerized by subjecting the monomer dissolved in a liquid organic solvent as diluent such as a liquid hydrocarbon or chlorinated hydrocarbon, e. g. propane, butane, benzene, toluene, chloroform, methylene chloride and the like, to contact with an acid catalyst such as boron fluoride or boron fluoride-diethyl ether complex as is described in U. S. P. 2,104,000 and 2,061,934. The monomer-diluent ratio may vary somewhat, for example, the proportions may extend from 1 part of the vinyl alkyl ether to 1 to 3 or 4 parts of the diluent. The catalyst is used in quite small amounts, for example, from about 0.05% to 1.0% $BF_3$ on the weight of the monomer, and is added to the monomer-diluent mixture as a dilute solution in a suitable volatile organic solvent, which conveniently is a quantity of the organic liquid used as the diluent for the monomer. The catalyst addition is made in a controlled and gradual manner, preferably with stirring of the monomer-diluent mixture. The polymerization occurs in a very short space of time, and is quite rapid, almost instantaneous when the catalyst used is boron fluoride gas dissolved in an organic volatile solvent such as propane. The latter may be obtained by bubbling the $BF_3$ through a chilled quantity of the propane.

Depending upon the acid catalyst used, the temperature of the polymerization and the monomer, the products of the polymerization will vary in consistency and range from viscous liquids, balsams, waxes and soft resins to rubber-like, flexible, form-stable solids of high molecular weight. The invention, in stabilization and in color improvement, is applicable to any of the polymers.

After the polymerization is completed, which may be determined by adding a few drops of the acid catalyst to a sample of the reaction mixture and observing the absence of further reaction, the catalyst is inactivated or quenched through neutralization thereof with an alkaline agent. For this purpose there is usually stirred into or worked with the polymerization mass in the reaction vessel a quantity of ammonium hydroxide, accompanied by a quantity of methanol where, in the case of the rubber-like solid polymers, a granular like product is desired. Where the polymers are solids, they are recovered from the reaction mass by decanting or filtering off the diluent, and are then dried, for example, at a temperature of 50° C. under a vacuum. The softer, semi-solid and more liquid polymers, are recovered in direct manner by evaporation of the solvent at reduced pressures at a temperature of about 50° C.

The stabilizer, p-hydroxy-N-phenylmorpholine, is preferably and advantageously incorporated in the polymers when first formed, thus to protect them before an objectionable degree of depolymerization by heat can occur. This can be accomplished by adding the stabilizer to the polymer in the reaction vessel along with the quenching or neutralizing agent for the acid catalyst. For this purpose the stabilizer can be added as a solution in a suitable volatile solvent in which the alkali metal hydroxide, carbonate or bicarbonate is also soluble, for example, a mixture of ethanol and water. By applying the stabilizer at the temperatures prevailing in the polymerization reaction, especially in the case of the high molecular weight, rubber-like flexible polymers which are obtained at polymerization temperatures of −50 to −70° C., retention of the molecular weight attained in the polymers is favored.

In contrast to the use of ammonium hydroxide in the quenching operation for the acid catalyst, which does not exert, or to any material degree exert a beneficial effect on the color of the polymer containing the p-hydroxy-N-phenylmorpholine, the use of the alkali as defined herein causes a perceptible improvement in the color of the stabilized polymer. Preferably, from the standpoint of cost, there are employed sodium hydroxide, sodium carbonate and sodium bicarbonate. The quantities of the carbonates and bicarbonates employed, obviously, will be larger than those of the hydroxides in view of their lower basicity values. Sodium carbonate, for example, can be successfully used in amounts of about 2% on the weight of the polymer. In any case, the alkali is taken in amount sufficient to neutralize the acid catalyst in the polymer plus a quantity above this amount which in the polymer will give an alkalinity equal to a pH value of at least 9 and preferably not more than 11.5. Greater alkalinities in the polymers will also cause improvement in the color of the stabilized polymers, but, obviously, are not desirable.

The invention is further illustrated by the following specific example. Parts are by weight:

*Example*

A stream of boron fluoride gas was bubbled for 5 seconds through 20 parts of propane chilled to −70° C. The cold solution of BF₃ in propane was then added in a slow continuous manner to a mixture at −60° C. of 20 parts of a purified vinyl isobutyl ether in 20 parts of propane as diluent. The addition of the catalyst is stopped on perceiving the first signs of reaction in the monomer-diluent mixture. This occurs in less than 1 minute. A gentle stirring of the reaction mixture is obtained during the addition by having solid carbon dioxide present in the mixture. The polymerization is completed almost instantaneously, with a temperature rise to −50° C. To the polymer in the reaction vessel and at approximately this low temperature of −50° C. is added 0.20 part of p-hydroxy-N-phenylmorpholine and 0.05 part of sodium hydroxide in solution in a mixture of 40 parts of ethanol and 20 parts of water. The polymer is well worked with the solution of stabilizer and alkali. The liquor surrounding the polymer tested by the glass electrode (Beckman pH meter) exhibited a pH=10. The rubber-like, flexible, form-stable polymer was separated by filtration and dried to constant weight at 50° C. under a vacuum.

A sample of the alkali treated stabilized polymer was then heated at 160° C. for two and one-half hours. The heat-tested polymer was a nearly colorless, rubber-like, flexible, form-stable solid.

The vinyl alkyl ethers employed in the production of the polymers may be those obtained from the reaction of acetylene and the corresponding aliphatic alcohols, which monomers have been subjected to washing with water to remove alcohol and any aldehyde present. In some cases it may be necessary to further purify the monomers as alcohols and aldehydes are inimical to the functioning of acid-reacting catalysts. This further purification may be accomplished by allowing the monomers to stand over powdered potassium hydroxide or metallic sodium for about 24 hours and then fractionally distilling them from the solid treating agent. One precise fractional distillation is generally sufficient.

I claim:

1. A process of preparing a stabilized polyvinyl alkyl ether of improved color which comprises incorporating in the polymer from 0.2 to 2% of p-hydroxy-N-phenylmorpholine and an amount of an alkali selected from the group consisting of alkali metal hydroxides, carbonates and bicarbonates sufficient to impart to the polymer an alkalinity equal to a pH value of 9 to 11.5 as measured by the glass electrode in a water-alcohol medium.

2. A stabilized polyvinyl alkyl ether of improved color containing from 0.2 to 2% of p-hydroxy-N-phenylmorpholine and an amount of an alkali selected from the group consisting of alkali metal hydroxides, carbonates and bicarbonates sufficient to impart to the polymer an alkalinity equal to a pH value of 9 to 11.5 as measured by the glass electrode in a water-alcohol medium.

3. A stabilized polyvinyl isobutyl ether of improved color containing from 0.2 to 2% of p-hydroxy-N-phenyl morpholine and an amount of sodium hydroxide sufficient to impart to the polymer an alkalinity equal to a pH value of 9 to 11.5 as measured by the glass electrode in a water-alcohol medium.

CALVIN E. SCHILDKNECHT.

REFERENCES CITED

The following references are of record in the file of this patent:

UNITED STATES PATENTS

| Number | Name | Date |
|---|---|---|
| 2,013,941 | Young et al. | Sept. 10, 1935 |
| 2,050,843 | Jacobsohn | Aug. 11, 1936 |